July 24, 1956
R. H. ORR
2,755,941
PARKING STRUCTURE
Filed March 13, 1953
2 Sheets-Sheet 2
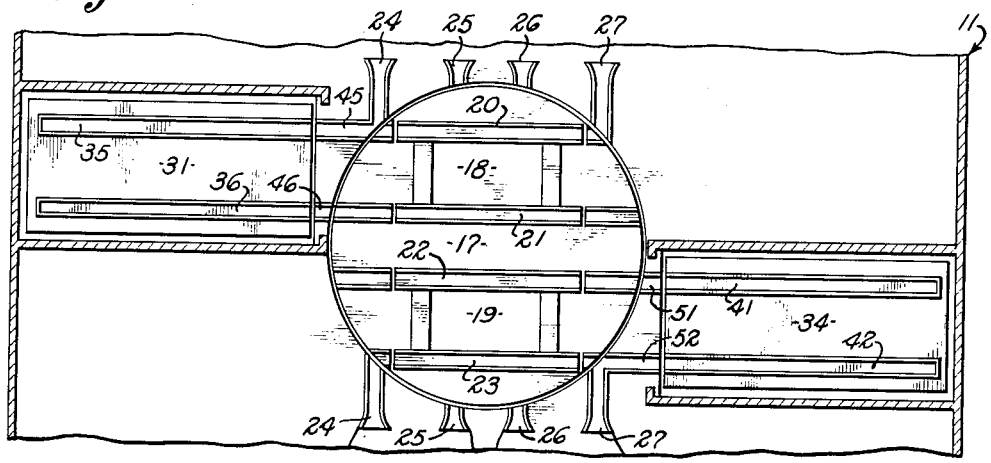
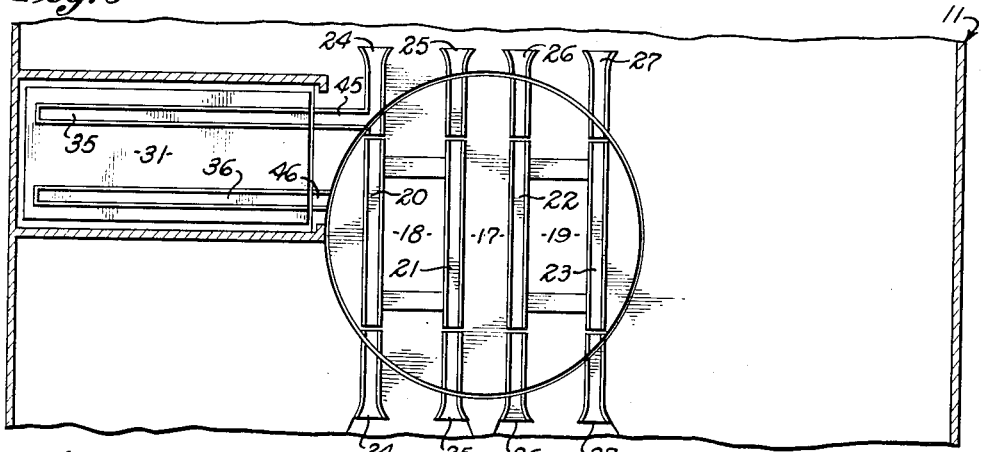
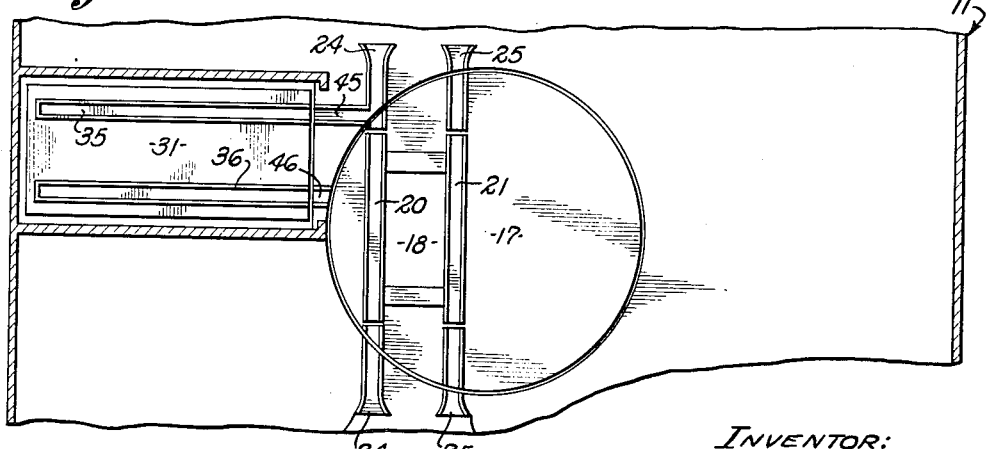
INVENTOR:
ROBERT H. ORR
BY HIS ATTORNEYS
HARRIS, KIECH, FOSTER & HARRIS

# United States Patent Office 2,755,941
Patented July 24, 1956

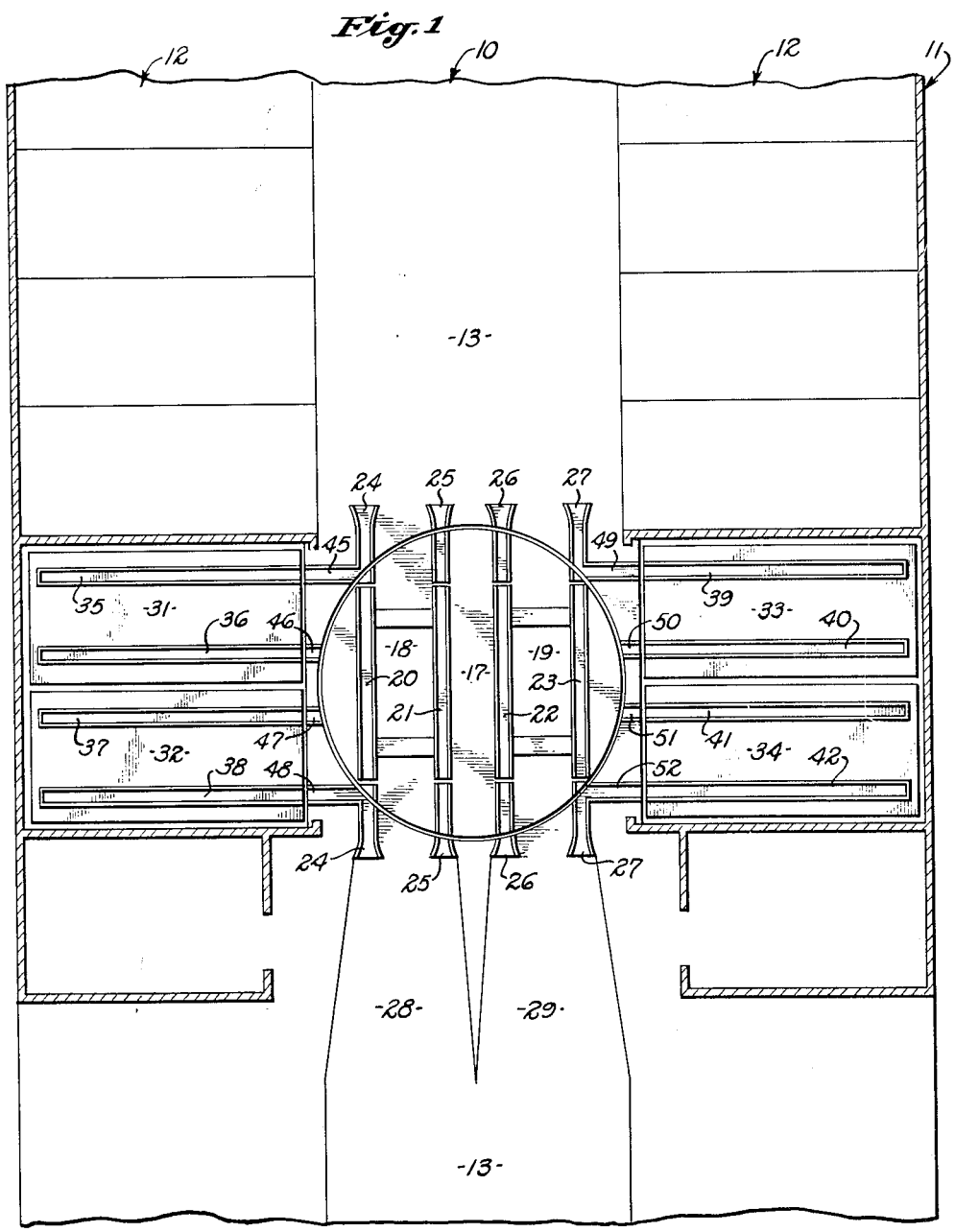

2,755,941
PARKING STRUCTURE
Robert H. Orr, Los Angeles, Calif.

Application March 13, 1953, Serial No. 342,225

1 Claim. (Cl. 214—16.1)

The present invention relates in general to multistory parking structures for automobiles, or other vehicles, and, more particularly, to a novel elevator loading and unloading apparatus for such a parking structure.

A primary object of the invention is to provide an apparatus which is capable of loading or unloading two banks of elevators disposed on opposite sides of a central aisle or driveway, and which is sufficiently compact to restrict the lot width required by the entire parking structure to not more than sixty feet. However, it will be understood that the invention is not to be regarded as limited to sixty-foot lots. For example, the invention may be utilized in connection with one elevator bank on one side of an aisle or driveway, which requires only a forty-foot lot.

More particularly, an object of the invention is to provide a parking structure which includes an aisle or driveway, which includes at least one elevator beside and at right angles to the driveway, and which includes a turntable in the driveway and providing an automobile stall offset laterally from the axis of rotation of the turntable, the elevator being offset laterally from the axis of rotation of the turntable the same distance as the stall on the turntable so that the stall on the turntable is aligned with the elevator in one angular position of the turntable.

Another object is to provide such a turntable which includes two parallel automobile stalls one offset laterally to one side of the axis of rotation of the turntable and the other offset laterally to the other side of such axis by the same distance so that two automobiles can be carried by the turntable at the same time.

Another object is to provide a parking structure which includes from one to four elevators each arranged at right angles to the aisle or driveway and each offset laterally from the axis of rotation of the turntable the same distance as the stalls on the turntable. With this construction each of the stalls on the turntable can be brought into registry with any one of the elevators, which is an important feature.

Another object is to provide wheel guides on the turntable forming the stalls thereon and to provide wheel guides on the elevators forming stalls thereon, the wheel guides on the elevator being adapted to register with fixed wheel guides which are set in the aisle or driveway and with which the wheel guides on the elevators are adapted to register. With this construction, when a stall on the turntable is aligned with the stall on one of the elevators, a continuous system of wheel guides connects the two stalls to facilitate transferring an automobile from the turntable to such elevator, or vice versa, which is an important feature.

The foregoing objects, advantages and features of the present invention, together with various other objects, advantages and features thereof which will become apparent, may be obtained with the exemplary embodiments of the invention which are illustrated in the accompanying drawings and which are described in detail hereinafter.

Referring to the drawings:

Fig. 1 is a ground floor plan of a parking structure embodying the invention; and Figs. 2, 3 and 4 are ground floor plans illustrating other embodiments of the invention.

Referring particularly to Fig. 1 of the drawings, the numeral 10 indicates generally the ground floor of a multi-story parking building or structure 11, the ground floor being provided with two banks 12 of parking stalls on opposite sides of a central aisle or driveway 13. The upper floors, not shown, are provided with similar banks of parking stalls on opposite sides of central passageways for transferring apparatuses, as is well known in the art.

Set in the aisle 13 substantially flush therewith is a turntable 17 having two automobile stalls 18 and 19 thereon, these stalls being laterally offset from the axis of rotation of the turntable on opposite sides thereof by equal distances. The stall 18 includes wheel guides 20 and 21 to receive the wheels of an automobile, these wheel guides preferably being troughs or channels. Similarly, the stall 19 is provided with wheel guides 22 and 23. When the turntable 17 is in the position shown in Fig. 1 of the drawings, the wheel guides 20, 21, 22 and 23 respectively register with wheel guides 24, 25, 26 and 27 in the aisle 13. Thus, automobiles may be driven from the street along passageways 28 and 29 into the stalls 18 and 19 on the turntable 17, or through the stall 18 or 19 into the aisle 13 beyond the turntable for ground floor or rear lot parking, the wheels of the automobiles being properly guided at all times by the wheel guides 20 to 27.

Disposed adjacent the turntable 17 and arranged at right angles to the aisle 13 are elevators 31, 32, 33 and 34, the elevators 31 and 32 being disposed on one side of the aisle 13 and the elevators 33 and 34 being disposed on the opposite side thereof and facing the elevators 31 and 32. Each of the elevators 31 to 34 is offset laterally to one side of the other of the axis of rotation of the turntable 17 by the same distance as the stalls 18 and 19 on the turntable 17 are offset therefrom. Consequently, if the turntable 17 is rotated 90° in the clockwise direction from the position shown in Fig. 1 of the drawings, the stall 18 will be aligned with or in registry with the elevators 31 and 33 and the stall 19 will be aligned with or in registry with the elevators 32 and 34. Conversely, if the turntable 17 is rotated 90° in the counterclockwise direction from the position shown in Fig. 1 of the drawings, the stall 18 will be in alignment with or in registry with the elevator 32 or 34 and the stall 19 will be in alignment with or in registry with the elevators 31 and 33. Thus, each of the stalls 18 and 19 on the turntable 17 may be aligned with any one of the elevators 31 to 34 so that automobiles may be transferred between any turntable stall and any elevator, which is an important feature of the invention.

In order to facilitate such transfer of automobiles between the turntable stalls 18 and 19 and the elevators 31 to 34, wheel guides adapted to cooperate with the previously mentioned wheel guides 20 to 23 are provided. More particularly, the elevator 31 is provided with wheel guides 35 and 36, the elevator 32 is provided with wheel guides 37 and 38, the elevator 33 is provided with wheel guides 39 and 40, and the elevator 34 is provided with wheel guides 41 and 42. The wheel guides 35 and 36 on the elevator 31 are adapted to register with fixed wheel guides 45 and 46, respectively, in the aisle 13. When the turntable stall 18 is in alignment with the elevator 31, the wheel guides 20 and 21 thereof register with the wheel guides 45 and 46, respectively, to provide a continuous guide path for an automobile being transferred either from the elevator 31 to the turntable stall 18, or vice versa. Similarly, when the turntable stall 19 registers with the elevator 31, the wheel guides 22 and 23 register with the wheel guides 46 and 45, respectively. Similarly, wheel guides 47 and 48 are associated with the elevator 32, wheel guides 49 and 50 are associated with the elevator 33 and wheel guides 51 and 52 are associated with the elevator 34, the wheel guides 20 and 21 of the stall 18 and the wheel guides 22 and 23 of the stall 19 being adapted to register with the wheel guides 47 to 52 in a similar manner to provide continuous guide paths between each of the elevators and the particular turntable stall aligned therewith.

The apparatus hereinbefore described is extremely versatile in that an automobile on one of the turntable stalls 18 and 19 may be transferred to any desired one of the elevators 31 to 34. Conversely, an automobile may be discharged from any one of the elevators 31 to 34 into either of the turntable stalls 18 or 19. Moreover, the entire installation is extremly compact so that the parking structure 11 may be erected on a lot no more than sixty feet in width, which is an important feature of the invention.

Any suitable mechanism for transferring automobiles between the turntable stalls 18 and 19 and the elevators 31 to 34 may be utilized so that any description thereof herein is thought to be unnecessary.

The embodiment of the invention which is illustrated in Fig. 2 of the drawings is identical to that hereinbefore disclosed, except that the elevators 32 and 33 are omitted, as are the corresponding wheel guides 47, 48, 49 and 50. The embodiment of Fig. 3 of the drawings is also identical to that illustrated in Fig. 1, except that only the elevator 31 and the corresponding wheel guides 45 and 46 are utilized in conjunction with the turntable 17. In Fig. 4 of the drawings is shown another possible embodiment which is also similar to that of Fig. 1, except that only the elevator 31, and its associated wheel guides 45 and 46, and the stall 18, with its associated wheel guides 24 and 25, are utilized. The embodiments of Figs. 2 to 4 may be utilized in small buildings, or they may be used in locations where the initial volume of business does not require the maximum numbers of turntable stalls and elevators. As will be apparent, turntable stalls and/or elevators can be added to the embodiments of Figs. 2 to 4 as desired until the numbers thereof in the embodiment of Fig. 1 are attained.

Although I have disclosed various exemplary embodiments of my invention herein for purposes of illustration, it will be understood that various changes, modifications and substitutions may be incorporated in such embodiments without departing from the spirit of the invention as defined by the claim which follows.

I claim as my invention:

In a parking structure for vehicles, the combination of: a building provided with a main floor having a two-lane driveway thereon; a turntable in said driveway and rotatable about a vertical axis through the centerline of said driveway between the lanes thereof, said turntable providing two parallel, single-vehicle stalls thereon respectively offset laterally from said axis on opposite sides thereof, said turntable being rotatable between first positions spaced 180° apart wherein said stalls thereon are aligned with said lanes, and said turntable being further rotatable between second positions spaced 180° apart, and respectively spaced 90° from said first positions, wherein said stalls thereon are perpendicular to said lanes; and four single-vehicle elevators two of which are located side-by-side on one side of said driveway opposite said turntable and the other two of which are located side-by-side on the other side of said driveway opposite and facing the first two elevators, respectively, said four elevators respectively being located within four quadrants bounded by said centerline and a normal thereto passing through said axis, said four elevators respectively providing four single-vehicle stalls which are perpendicular to said driveway and which are offet laterally from said normal the same distance that said stalls on said turntable are offset from said axis, whereby, when said turntable is in either of said second positions, each of said stalls thereon is aligned with said stalls on two of said elevators.

References Cited in the file of this patent

UNITED STATES PATENTS

| | | |
|---|---|---|
| 1,404,926 | Burnham | Jan. 31, 1922 |
| 1,528,893 | Rother | Mar. 10, 1925 |
| 1,582,099 | Trask | Apr. 27, 1926 |
| 1,972,258 | Boyle | Sept. 4, 1934 |
| 2,069,886 | Joslin | Feb. 9, 1937 |
| 2,626,721 | Lodge et al. | Jan. 27, 1953 |
| 2,667,980 | Dawson | Feb. 2, 1954 |